United States Patent
Khmelnitsky et al.

(10) Patent No.: US 8,321,647 B2
(45) Date of Patent: Nov. 27, 2012

(54) MULTIPAGE PREPARATION COMMANDS FOR NON-VOLATILE MEMORY SYSTEMS

(75) Inventors: Vadim Khmelnitsky, Foster City, CA (US); Nir Jacob Wakrat, Los Altos, CA (US); Tahoma Toelkes, San Jose, CA (US); Daniel Jeffrey Post, Campbell, CA (US); Anthony Fai, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 365 days.

(21) Appl. No.: 12/545,011

(22) Filed: Aug. 20, 2009

(65) Prior Publication Data

US 2010/0287353 A1 Nov. 11, 2010

Related U.S. Application Data

(60) Provisional application No. 61/176,096, filed on May 6, 2009.

(51) Int. Cl.
*G06F 13/00* (2006.01)
*G06F 13/28* (2006.01)
(52) U.S. Cl. .................. 711/170; 711/154; 711/E12.002
(58) Field of Classification Search .................. None
See application file for complete search history.

(56) References Cited

U.S. PATENT DOCUMENTS

| | | | |
|---|---|---|---|
| 4,937,830 A | 6/1990 | Kawashima et al. | |
| 5,341,489 A | 8/1994 | Heiberger et al. | |
| 5,559,449 A | 9/1996 | Padoan et al. | |
| 5,613,144 A | 3/1997 | Hall et al. | |
| 5,615,162 A | 3/1997 | Houston | |
| 5,673,223 A | 9/1997 | Park | |
| 5,751,631 A | 5/1998 | Liu et al. | |
| 6,092,158 A | 7/2000 | Harriman et al. | |
| 6,134,149 A | 10/2000 | Lin | |
| 6,148,354 A | 11/2000 | Ban et al. | |
| 6,449,111 B1 | 9/2002 | Kool et al. | |
| 6,684,301 B1 | 1/2004 | Martin | |
| 7,372,715 B2 | 5/2008 | Han | |
| 7,975,109 B2 | 7/2011 | McWilliams et al. | |
| 7,979,658 B2 | 7/2011 | Obereiner et al. | |
| 2002/0194451 A1 | 12/2002 | Mukaida et al. | |
| 2003/0046628 A1 | 3/2003 | Rankin | |
| 2003/0200411 A1 | 10/2003 | Maeda et al. | |

(Continued)

OTHER PUBLICATIONS

Toshiba, "TC58NVG0S3ETA00 Toshiba Mos Digital Intergrated Circuit Silicon Gate CMOS", Nov. 20th 2008, revision 1.00, Semico Toshiba, pp. 1-65. http://www.semicon.toshiba.co.jp/docs/datasheet/en/Memory/TC58NVG0S3ETA00_en_datasheet_110301.pdf.*

(Continued)

*Primary Examiner* — Charles Rones
*Assistant Examiner* — Eric S Cardwell
(74) *Attorney, Agent, or Firm* — B. Noel Kivlin; Meyertons, Hood, Kivlin, Kowert & Goetzel, P.C.

(57) ABSTRACT

Multipage preparation commands for non-volatile memory systems are disclosed. The multipage preparation commands supply data that can be used to prepare a non-volatile memory device for forthcoming multipage program operations. A host controller can use the commands ahead of a multipage program operation to optimize usage of a multipage program command. The non-volatile memory device can use the commands to configure the non-volatile memory in preparation for a subsequent operation, such as changing a command order or using the most optimized command set for the subsequent operation.

23 Claims, 6 Drawing Sheets

U.S. PATENT DOCUMENTS

| | | |
|---|---|---|
| 2004/0139286 A1 | 7/2004 | Lin et al. |
| 2004/0153902 A1 | 8/2004 | Machado et al. |
| 2004/0257888 A1 | 12/2004 | Noguchi et al. |
| 2005/0166007 A1 | 7/2005 | Ono |
| 2006/0059406 A1 | 3/2006 | Micheloni et al. |
| 2006/0164907 A1 | 7/2006 | Nguyen |
| 2006/0248432 A1 | 11/2006 | Barrett |
| 2007/0043900 A1 | 2/2007 | Yun |
| 2007/0050668 A1 | 3/2007 | Gans |
| 2007/0106919 A1 | 5/2007 | Chang et al. |
| 2007/0140007 A1 | 6/2007 | Terauchi |
| 2007/0165458 A1 | 7/2007 | Leong et al. |
| 2007/0168625 A1 | 7/2007 | Cornwell et al. |
| 2008/0069098 A1 | 3/2008 | Shah et al. |
| 2008/0126776 A1 | 5/2008 | Takayama |
| 2008/0147968 A1 | 6/2008 | Lee et al. |
| 2008/0147994 A1 | 6/2008 | Jeong et al. |
| 2008/0195799 A1 | 8/2008 | Park |
| 2008/0211303 A1 | 9/2008 | Ikegawa |
| 2008/0288814 A1 | 11/2008 | Kitahara |
| 2009/0063934 A1 | 3/2009 | Jo |
| 2009/0100115 A1 | 4/2009 | Park et al. |
| 2009/0113114 A1 | 4/2009 | Berenbaum et al. |
| 2009/0164698 A1 | 6/2009 | Ji et al. |
| 2009/0198902 A1 | 8/2009 | Khmelnitsky et al. |
| 2009/0198947 A1 | 8/2009 | Khmelnitsky et al. |
| 2009/0198952 A1 | 8/2009 | Khmelnitsky et al. |
| 2009/0265513 A1 | 10/2009 | Ryu |
| 2010/0250836 A1 | 9/2010 | Sokolov et al. |
| 2010/0287329 A1 | 11/2010 | Toelkes et al. |
| 2010/0287353 A1 | 11/2010 | Khmelnitsky et al. |
| 2011/0153911 A1 | 6/2011 | Sprouse et al. |
| 2011/0213945 A1 | 9/2011 | Post et al. |

OTHER PUBLICATIONS

Toelkes et al., "Partial Page Operations for Non-Volatile Memory Systems", U.S. Appl. No. 12/536,410, filed Aug. 5, 2009.

Post et al., "Low Latency Read Operation for Managed Non-Volatile Memory", U.S. Appl. No. 12/538,053, filed Aug. 7, 2009.

Wakrat et al., "Controller for Optimizing Throughput of Read Operations", U.S. Appl. No. 12/509,240, filed Jul. 24, 2009.

International Search and Written Opinion for Application No. PCT/US2010/032628, dated Aug. 11, 2010, 12 pages.

Toelkes et al., "Architecture for Address Mapping of Managed Non-Volatile Memory", U.S. Appl. No. 12/614,369, filed Nov. 6, 2009.

Wakrat et al., "Memory Array Power Cycling", U.S. Appl. No. 12/561,158, filed Sep. 16, 2009.

Wakrat et al., "File System Derived Metadata for Management of Non-Volatile Memory", U.S. Appl. No. 12/561,173, filed Sep. 16, 2009.

International Search Report/Written Opinion in PCT/US2010/32627 mailed Jul. 21, 2010, 10 pages.

International Search Report/Written Opinion in PCT/US2009/065804 mailed May 10, 2010, 17 pages.

Invitation to Pay Additional Fees and, Where Applicable, Protest Fee in PCT/US2009/065804 mailed Mar. 4, 2010, 4 pages.

"Increasing Boot Operations with Managed NAND," QuickLogic® White Paper, Quicklogic Corporation [online], Retrieved from the Internet: <http://www.quicklogic.com/images/QL:_Increasing_Boot_Opt_w_Managed_NAND_WP_RevE.pdf>, 2007-2009, 8 pages.

"Dual supply level translator for dual memory cards (mini SD/micro SD + managed NAND)," STMicroelectronics, Paper No. ST6G3240 [online], Retrieved from the Internet: <http://www.st.com/stonline/products/literature/ds/14581.pdf>, Apr. 2008, 29 pages.

Lim et al., "An Efficient NAND Flash File System for Flash Memory Storage," IEEE Transactions on Computers, 2006, 55(7):906-912.

International Preliminary Report on Patentability in PCT/US2009/065804 mailed Jul. 7, 2011, 12 pages.

International Preliminary Report on Patentability in PCT/US2010/32627 mailed Nov. 9, 2011, 8 pages.

International Preliminary Report on Patentability in PCT/US2010/032628 dated Nov. 9, 2011, 8 pages.

* cited by examiner

| Stride Number | CAU 0 | CAU 1 | CAU 2 |
|---|---|---|---|
| 1 | CAU 0, Block 1 | CAU 1, Block 1 | CAU 2, Block 1 |
| 2 | CAU 0, Block 2 | CAU 1, Block 2 | CAU 2, Block 2 |
| 3 | CAU 0, Block 3 | CAU 1, Block 3 | CAU 2, Block 3 |
| 4 | CAU 0, Block 4 | CAU 1, Block 2000 | CAU 2, Block 4 |
| 5 | CAU 0, Block 5 | CAU 1, Block 5 | CAU 2, Block 5 |
| 6 | CAU 0, Block 6 | CAU 1, Block 6 | CAU 2, Block 6 |
| 7 | CAU 0, Block 7 | CAU 1, Block 7 | CAU 2, Block 7 |
| ...... | ...... | ...... | ...... |
| ...... | ...... | ...... | ...... |
| 1999 | CAU 0, Block 1999 | CAU 1, Block 1999 | CAU 2, Block 1999 |

FIG. 3

MULTIPAGE PREPARATION COMMANDS FOR NON-VOLATILE MEMORY SYSTEMS

RELATED APPLICATION

This application claims the benefit of priority from U.S. Provisional Patent Application No. 61/176,096, filed May 6, 2009, which is incorporated by reference herein in its entirety.

TECHNICAL FIELD

This subject matter is related generally to access and management of managed non-volatile memory (NVM).

BACKGROUND

Flash memory is a type of electrically erasable programmable read-only memory (EEPROM). Because flash memories are non-volatile and relatively dense, they are used to store files and other persistent objects in handheld computers, mobile phones, digital cameras, portable music players, and many other devices in which other storage solutions (e.g., magnetic disks) are inappropriate.

NAND is a type of flash memory that can be accessed like a block device, such as a hard disk or memory card. Each block consists of a number of pages (e.g., 64-128 pages). A typical page size is 4 KB-8 KB bytes. A NAND device can have multiple dies each having 4096-8192 blocks. Associated with each page are a number of bytes that are used for storage of error detection and correction checksums. Reading and programming is performed on a page basis, erasure is performed on a block basis, and data in a block can only be written sequentially. NAND relies on Error Correction Code (ECC) to compensate for bits that may flip during normal device operation. When performing erase or program operations, the NAND device can detect blocks that fail to program or erase and mark the blocks as bad in a bad block map. The data can be written to a different, good block, and the bad block map updated.

Managed NAND devices combine raw NAND with a memory controller to handle error correction and detection, as well as memory management functions of NAND memory. Managed NAND is commercially available in Ball Grid Array (BGA) packages, or other Integrated Circuit (IC) package which supports standardized processor interfaces, such as Multimedia Memory Card (MMC) and Secure Digital (SD) card. A managed NAND device can include a number of NAND devices or dies, which can be accessed using one or more chip select signals. A chip select is a control line used in digital electronics to select one chip out of several chips connected to the same bus. The chip select is typically a command pin on most IC packages, which connects the input pins on the device to the internal circuitry of that device. When the chip select pin is held in the inactive state, the chip or device ignores changes in the state of its input pins. When the chip select pin is held in the active state, the chip or device responds as if it is the only chip on the bus.

The Open NAND Flash Interface Working Group (ONFI) has developed a standardized low-level interface for NAND flash chips to allow interoperability between conforming NAND devices from different vendors. ONFI specification version 1.0 specifies: a standard physical interface (pin-out) for NAND flash in TSOP-48, WSOP-48, LGA-52, and BGA-63 packages; a standard command set for reading, writing, and erasing NAND flash chips; and a mechanism for self-identification. ONFI specification version 2.0 supports dual channel interfaces, with odd chip selects (also referred to as chip enable or "CE") connected to channel 1 and even CEs connected to channel 2. The physical interface shall have no more than 8 CEs for the entire package.

While the ONFI specifications allow interoperability, the current ONFI specifications do not take full advantage of Managed NAND solutions.

SUMMARY

Multipage preparation commands for non-volatile memory systems are disclosed. The multipage preparation commands supply data that can be used to prepare a non-volatile memory device for forthcoming multipage program operations. A host controller can use the commands ahead of a multipage program operation to optimize usage of a multipage program command. The non-volatile memory device can use the commands to configure the non-volatile memory in preparation for a subsequent operation, such as changing a command order or using the most optimized command set for the subsequent operation.

BRIEF DESCRIPTION OF THE DRAWINGS

FIG. 3 illustrates the address mapping of FIG. 2 including bad block replacement.

DETAILED DESCRIPTION

Memory System Overview

Figure 1:
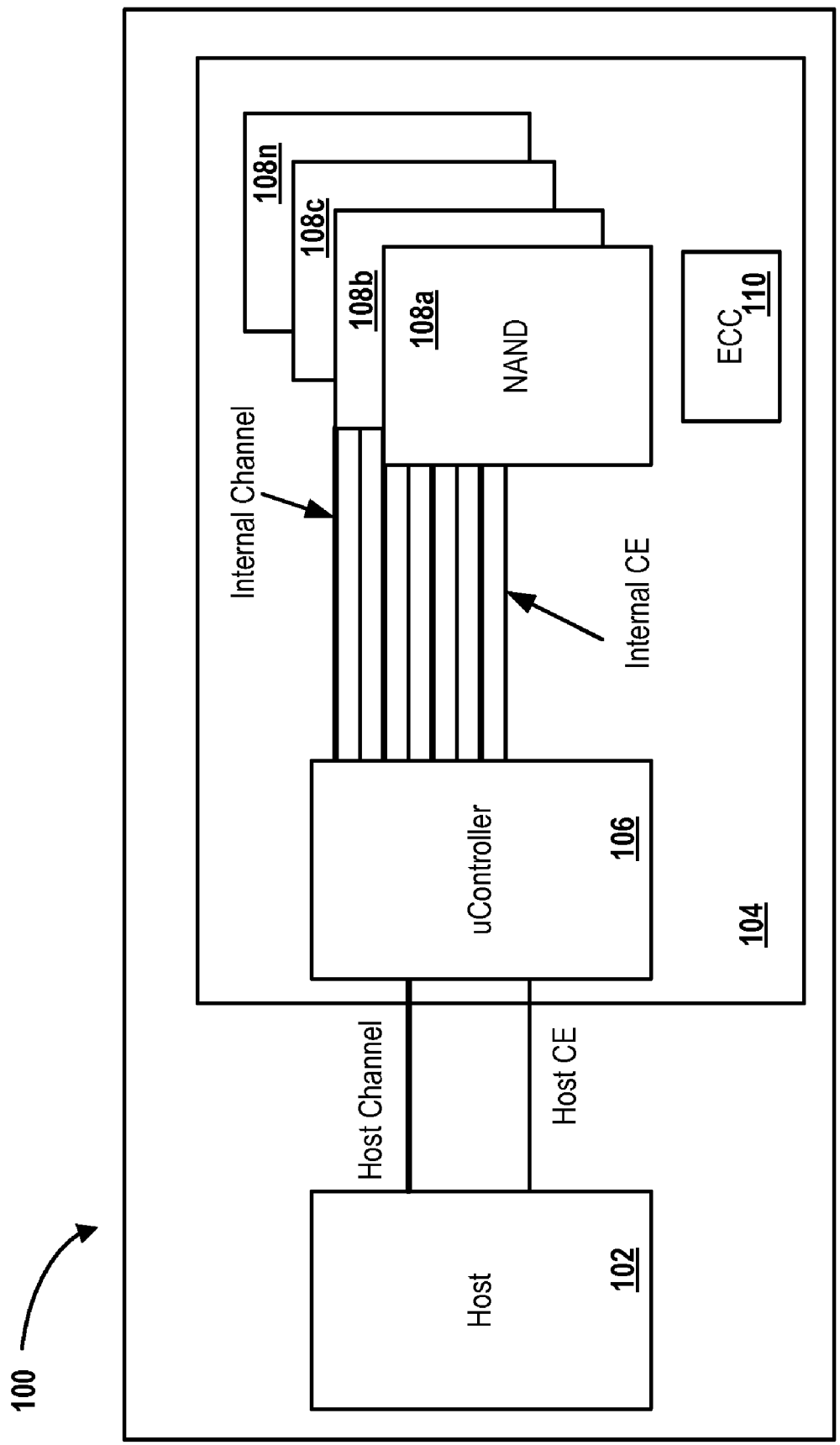
FIG. 1 is a block diagram of an exemplary memory system including a host processor coupled to a managed NVM package.

FIG. 1 is a block diagram of an exemplary memory system 100 including a host controller 102 coupled to a managed NVM package 104 (e.g., a NAND device). The NVM package 104 can be a BGA package or other IC package, including multiple NVM devices 108 (e.g., multiple raw NAND dies). The memory system 100 can be used in a variety of devices, including but not limited to: handheld computers, mobile phones, digital cameras, portable music players, toys, thumb drives, email devices, and any other devices in which non-volatile memory is desired or required. As used herein, raw NVM is a memory device or package which is managed by an external host processor, and managed NVM is a memory device or package that includes at least one internal memory management function, such as error correction, wear leveling, bad block management, etc.

In some implementations, the NVM package 104 can include a controller 106 for accessing and managing the NVM devices 108 over internal channels using internal chip select signals. An internal channel is a data path between the controller 106 and a NVM device 108. The controller 106 can perform memory management functions (e.g., wear leveling, bad block management) and can include an error correction (ECC) engine 110 for detecting and correcting data errors (e.g., flipped bits). In some implementations, the ECC engine 110 can be implemented as a hardware component in the controller 106 or as a software component executed by the controller 106. In some implementations, the ECC engine 110 can be located in the NVM devices 108.

In some implementations, the host controller 102 and NVM package 104 can communicate information (e.g., control commands, addresses, data) over a communication channel visible to the host ("host channel"). The host channel can support standard interfaces, such as raw NAND interfaces or dual channel interfaces, such as is described in ONFI specification version 2.0. The host controller 102 can also provide a host chip enable (CE) signal. The host CE is visible to the host controller 102 to select the host channel.

In the exemplary memory system 100, the NVM package 104 supports CE hiding. CE hiding allows the single host CE to be used for each internal channel in the NVM package 104, thus reducing the number of signals required to support the interface of the NVM package 104. Memory accesses can be mapped to internal channels and the NVM devices 108 using an address space and address mapping, as described in reference to FIGS. 2 and 3. Individual NVM devices 108 can be enabled using internal CE signals generated by the controller 106.

Exemplary Address Mapping

Figure 2:
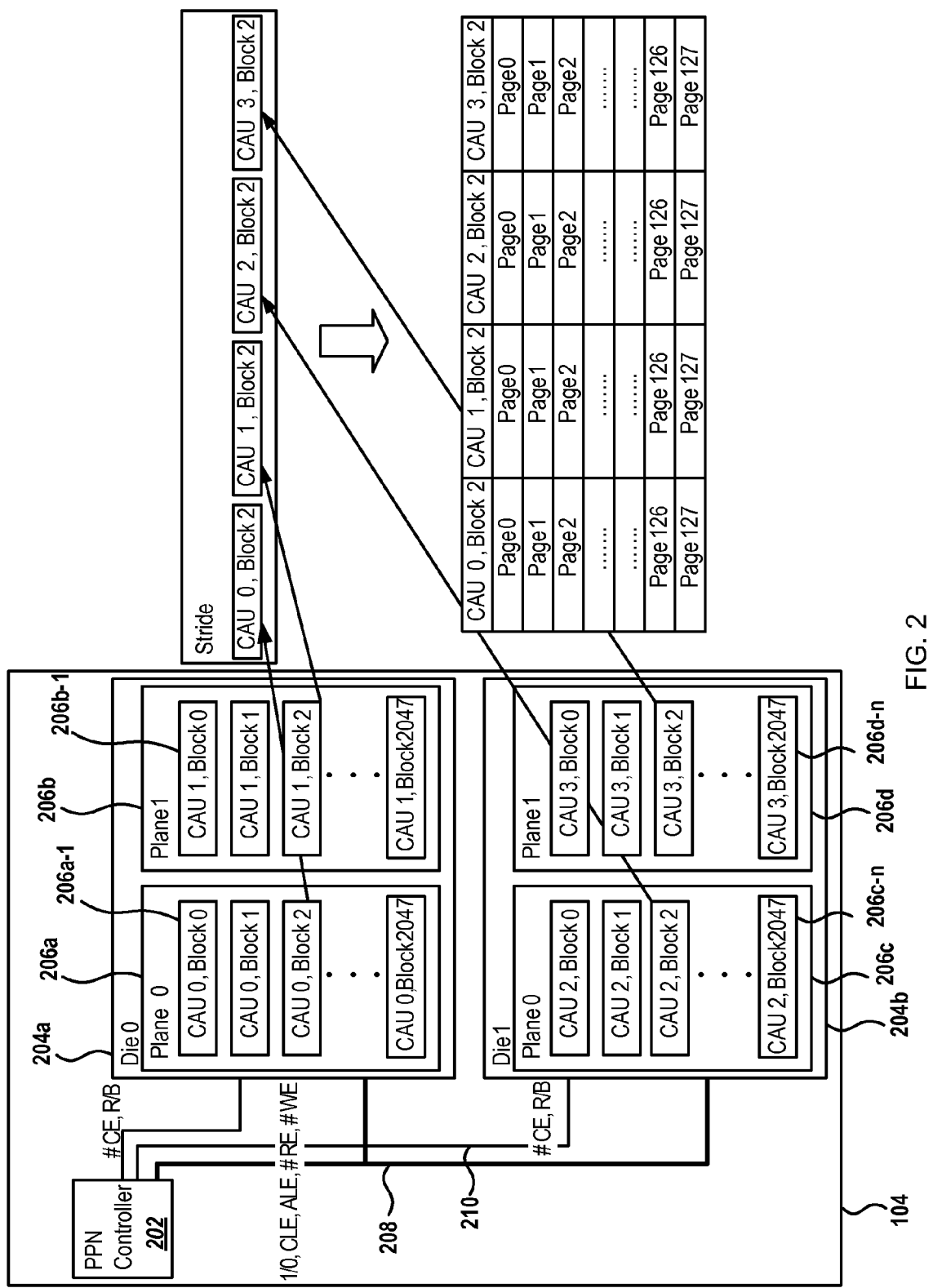
FIG. 2 illustrates an exemplary address mapping for the managed NVM package of FIG. 1.

FIG. 2 illustrates an exemplary address mapping for the managed NVM package 104 of FIG. 1. In particular, the mapping can be used with managed NAND devices that include multiple dies, where each die can potentially include multiple planes. In some implementations, the address mapping operates on Concurrently Addressable Units (CAUs). A CAU is a portion of physical storage accessible from a single host channel that may be read, programmed or erased simultaneously to, or in parallel with other CAUs in the NVM package. A CAU can be, for example, a single plane or a single die. A CAU size is the number of erasable blocks in a CAU.

The mapping will be described using the exemplary memory architecture of FIG. 2. For this exemplary architecture, a block size is defined as a number of pages in an erasable block. In some implementations, 16 bytes of metadata are available for each 4 kilobytes of data. Other memory architectures are also possible. For example, the metadata can be allocated more or fewer bytes.

The address mapping shown in FIG. 2 allows the use of raw NAND protocol to read/program/erase NAND blocks and additional commands that enable optimized performance. The NVM package 104 includes an ECC engine (e.g., ECC engine 110) for managing data reliability of the NAND. Thus, the host controller 102 does not need to include an ECC engine 110 or otherwise process data for reliability purposes.

The NVM package 104 defines a CAU as an area that can be accessed (e.g., moving data from the NAND memory cells to an internal register) simultaneous to, or in parallel with other CAUs. In this exemplary architecture, it is assumed that all CAUs include the same number of blocks. In other implementations, CAUs can have a different numbers of blocks. Table I below describes a exemplary row address format for accessing a page in a CAU.

TABLE I

Exemplary Row Address Format

| R[X + Y: X + Z − 1] | R[X:X + Y − 1] | R[0:X − 1] |
|---|---|---|
| CAU | Block | Page |

Referring to Table I, an exemplary n-bit (e.g., 24 bits) row address can be presented to a controller in the NAND device in the following format: [CAU: Block: Page]. CAU is a number (e.g., an integer) that represents a die or plane. Block is a block offset in the CAU identified by the CAU number, and Page is a page offset in the block identified by Block. For example, in a device with 128 pages per block, 8192 blocks per CAU and 6 CAUs: X will be 7 (27=128), Y will be 13 (213=8192) and Z will be 3 (22<6<23).

The exemplary NVM package 104 shown in FIG. 2 includes two NAND dies 204a, 204b, and each die has two planes. For example, die 204a includes planes 206a, 206b. And, die 204b includes planes 206c, 206d. In this example, each plane is a CAU and each CAU has 2048 multi-level cell (MLC) blocks with 128 pages per block. Program and erase operations can be performed on a stride of blocks (a block from each CAU). A stride is defined as an array of blocks each coming from a different CAU. In the example shown, a "stride 0" defines a block 0 from each of CAUs 0-3, a "stride 1" defines a block 1 from each of CAUs 0-3, a "stride 2" defines a block 2 from each of CAUs 0-3 and so forth.

The NVM package includes an NVM controller 202, which communicates with the CAUs through control bus 208 and address/data bus 210. During operation, the NVM controller 202 receives commands from the host controller (not shown) and in response to the command asserts control signals on the control bus 208 and addresses or data on the address/data bus 210 to perform an operation (e.g., read, program, or erase operation) on one or more CAUs. In some implementations, the command includes a row address having the form [CAU: Block: Page], as described in reference to FIG. 2.

FIG. 3 illustrates the address mapping of FIG. 2 including bad block replacement. In this example, host controller 102 issues a stride address for NVM package 104. The NVM package includes three CAUs, where one of the CAUs includes a bad block in the stride block offset. A "stride 4" address would normally access CAU0: Block4, CAU1: Block4 and CAU2: Block4. In this example, however, the bad block CAU1: Block4 is replaced by CAU1: Block2000.

Exemplary NVM Package for Receiving Multipage Preparation Commands

Figure 4:
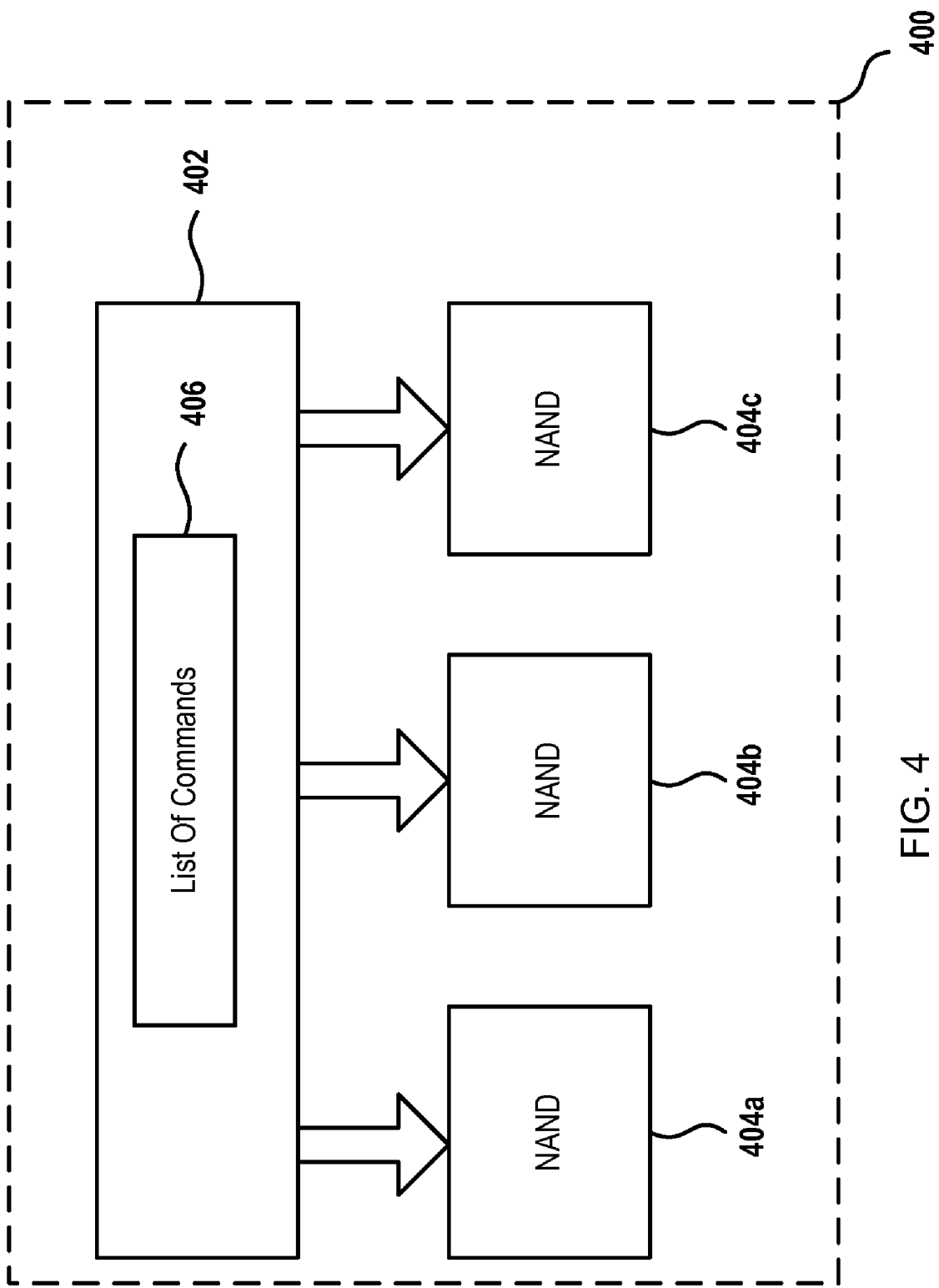
FIG. 4 illustrates an NVM package for receiving multipage preparation commands.

FIG. 4 illustrates an NVM package for receiving multipage preparation commands. In some implementations, an NVM package 400 includes a controller 402, which maintains a list of multipage preparation commands received from an external host controller (not shown). The commands can include a row address [CAU: Block: Page], which the controller can use to prepare CAUs for multipage operations, such as multipage program operations.

The NVM package 400 can take advantage of the row address supplied by the multipage preparation command to order and use the most optimized command set to program pages or perform other operations. In some implementations, 3 bytes of address are used in the command to transfer two things:
- Byte 0—the command that will use the information, and
- Bytes 1-2—address count; the number of pages that will be accessed in the multipage operation.

The data bytes (input/write) can be used to transfer the page addresses (row) that will be used in the forthcoming multipage operations. The addresses count and page addresses can both be little endian.

Figure 5:
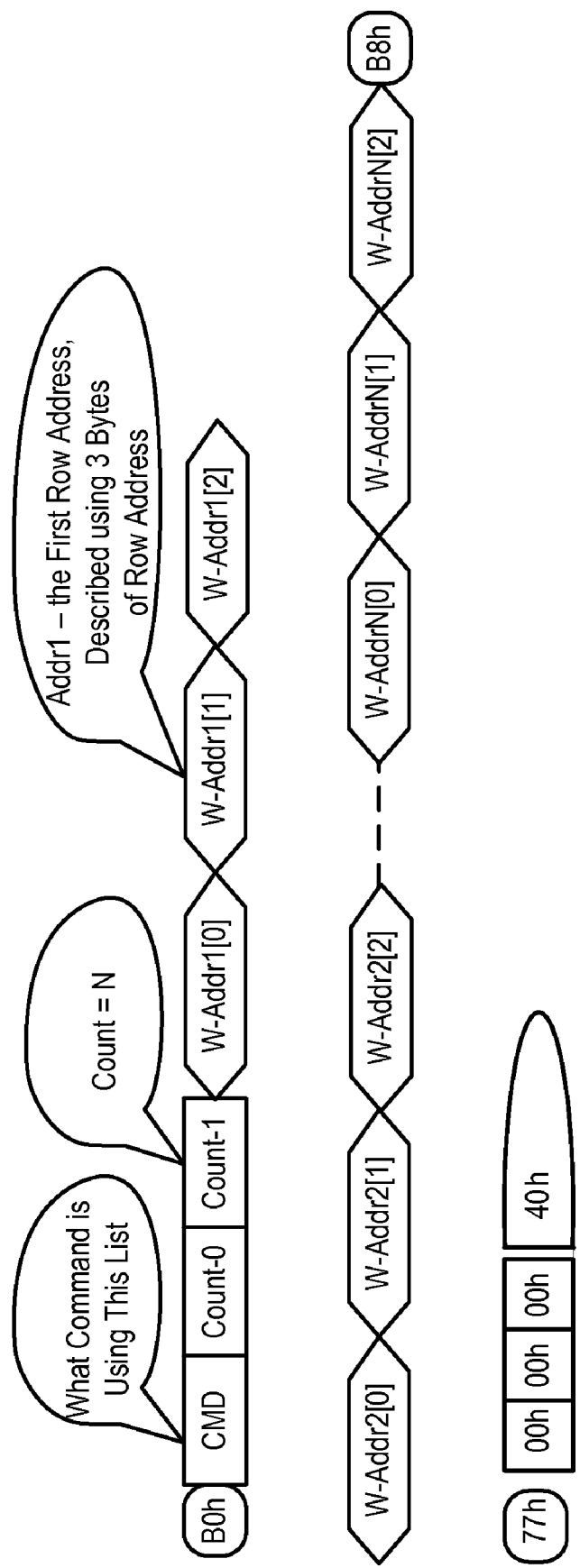
FIG. 5 is a timing diagram for an exemplary multipage preparation operation.

FIG. 5 is a timing diagram for an exemplary multipage preparation operation. In some implementations, the host controller can transfer more than 3*N bytes, where N is the number of pages to be programmed. In the example shown, a multipage program preparation operation is described. Other types of operations can be used as well.

The first code, B0h, indicates a multipage program preparation operation. CMD describes the multipage program command the host controller will use to program the page addresses W-addr[0], W-addr[1] and W-addr[2] with data. The two bytes, Count-0 and Count-1, indicate the number of page addresses, W-addr[x] following the Count. In this example, there are 3 page addresses following the Count bytes. The host controller can elect to terminate a program operation earlier then page N (e.g., utilizing the last command). The NVM package can then finish the operation correctly. All pages transferred can be programmed. Pages that were not programmed can remain erased and can be programmed later. The code 77h followed by the codes 00h, 00h, 00h and 40h represent a status request command to determine if the pages were programmed.

Following a multipage preparation operation, the host controller can check the operation status and respond or act according to the status values. Table II below specifies the different values a read operation status may return and an explanation of what the host controller is expected to do.

TABLE II

Exemplary Status Values for Multipage Preparation Error Handling

| Bits | | | | | | | | Data Availability & Expected Host Behavior |
|---|---|---|---|---|---|---|---|---|
| 0 | 1 | 2 | 3 | 4 | 5 | 6 | 7 | Comments |
| 0 | 0 | 0 | 0 | 0 | X | 1 | X | Done Successfully |
| 1 | 0 | 0 | 0 | 0 | X | 1 | X | Operation failed; host should try again |
| 1 | 0 | 0 | 1 | 0 | X | 1 | X | Protocol error; resend command |

Exemplary Process Performed by Host Controller

Figure 6:
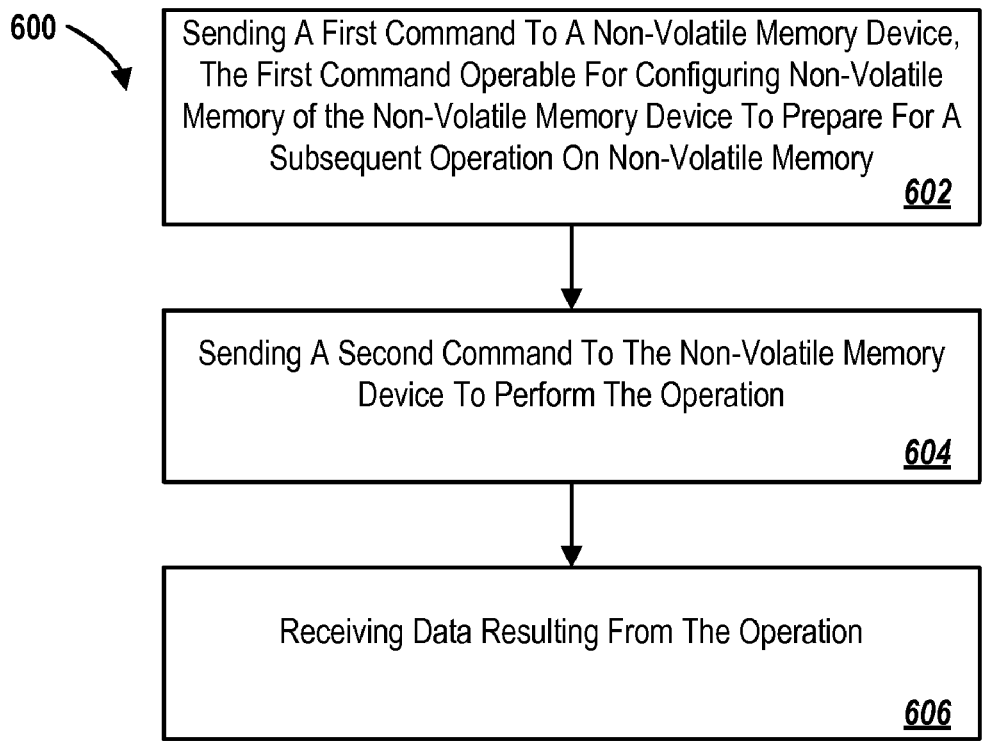
FIG. 6 is a flow diagram of an exemplary process performed by a host controller for multipage preparation command processing.

FIG. 6 is a flow diagram of an exemplary process 600 performed by a host controller for multipage preparation command processing. In some implementations, the process 600 begins by sending a first command to a non-volatile memory device (602). The first command is operable for configuring non-volatile memory of the non-volatile memory device to prepare for a subsequent operation on the non-volatile memory.

In some implementations, the controller in the device can queue CAU enablement and addressing schemes using the preparation command. In other implementations, the controller can concurrently receive feedback information along with the preparation command. In one example, the feedback information can describe planes, dies or busses that are busy, so that alternative pathways can be selected and used by the controller to perform memory operations.

Some raw NAND dies within an NVM device are capable of supporting various advanced operations, such as "Two-Plane Cache-Mode Program." The NVM controller can use information present in a preparation command to analyze patterns of program operations that are to be performed to possibly identify sub-sequences of a full sequence where the advanced operation can be applied to obtain a more optimal data transfer. A protocol governing the interoperability of the NVM device and a host controller can include preparation commands to enable sequences of operations that are comprised of full strides of increasing page addresses within each stride of blocks. NVM device vendors can use preparation commands to make use of performance-enhancing features of their raw NAND devices so that developers of host controller stacks need not know specific details of the performance-enhancing features.

A second command is sent to the non-volatile memory device to perform the operation (604). Data is received from the non-volatile memory device that results from the operation (606).

Exemplary Process Performed by Memory Device

Figure 7:
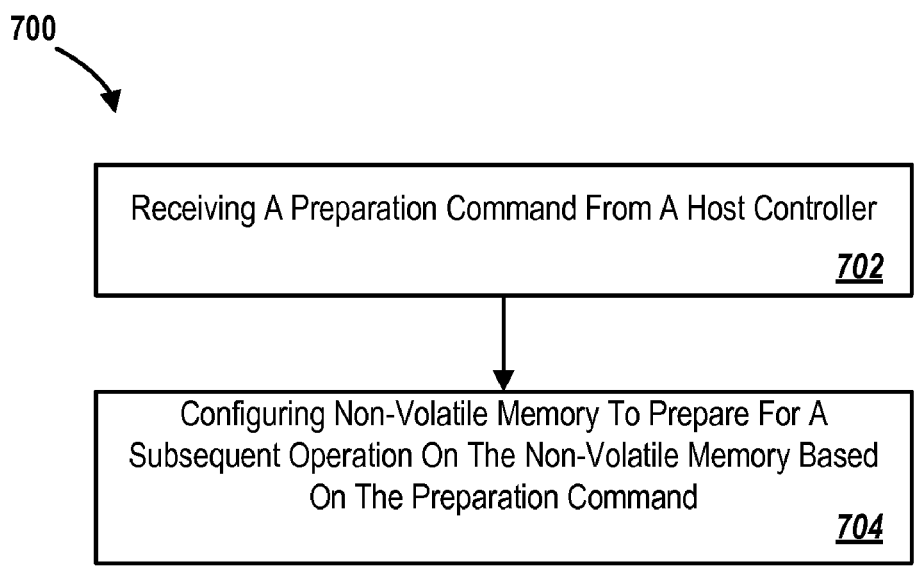
FIG. 7 is a flow diagram of an exemplary process performed by a non-volatile memory device for multipage preparation command processing.

FIG. 7 is a flow diagram of an exemplary process 700 performed by a non-volatile memory device for multipage preparation command processing. In some implementations, the process 700 begins by receiving a command from a host controller (702). The command can be a multipage program preparation command. Non-volatile memory is configured to prepare for a subsequent operation on the non-volatile memory based on the preparation command (704). Configuring can include changing the command order or using an optimized command set.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. A method comprising:
   receiving a preparation command from a host controller, the preparation command including information for preparing non-volatile memory for one or more subsequent multipage operations, the preparation command configured to be used ahead of a multipage operation to optimize usage of a multipage command associated with the multipage operation; and configuring the non-volatile memory to prepare for a subsequent multipage operation on the non-volatile memory based on the preparation command, where the information in the preparation command includes at least one of information associated with the multipage command, an address count associated with a number of addresses on which the multipage command is to be performed, or a number of pages that are to be accessed during the multipage operation.

2. The method of claim 1, where configuring includes changing a command order or using an optimized command set.

3. The method of claim 1, where the command is at least one of a read or program command.

4. The method of claim 1, where the command is status request command.

5. The method of claim 1, where the subsequent operation is a multipage program operation.

6. A method comprising:
sending a first command to a non-volatile memory device, the first command operable for configuring non-volatile memory of the non-volatile memory device to prepare for a subsequent operation on the non-volatile memory, the first command including information for analyzing the subsequent operation to optimize the subsequent operation;
sending a second command to the non-volatile memory device to perform the operation on the non-volatile memory; and
receiving data resulting from the operation,
where the information in the first command includes at least one of information associated with the second command, an address count associated with a number of addresses on which the second command is to be performed, or a number of pages that are to be accessed during the second operation.

7. The method of claim 6, where configuring includes changing a command order or using an optimized command set.

8. The method of claim 6, where the first command is at least one of a read or program command.

9. The method of claim 6, where the first command is status request command.

10. The method of claim 6, where the second command is a multipage program operation.

11. A device, comprising:
an interface configured for receiving a preparation command from a host controller, the preparation command including information for preparing non-volatile memory for subsequent multipage operations, the preparation command configured to be used ahead of a multipage operation to optimize usage of a multipage command associated with the multipage operation; and
a controller coupled to the interface and operable for configuring the non-volatile memory to prepare for a subsequent multipage operation on the non-volatile memory based on the preparation command,
where the information in the preparation command includes at least one of information associated with the multipage command, an address count associated with a number of addresses on which the multipage command is to be performed, or a number of pages that are to be accessed during the multipage operation.

12. The device of claim 11, where the controller configures the non-volatile memory by changing a command order or using an optimized command set.

13. The device of claim 11, where the command is at least one of a read or program command.

14. The device of claim 11, where the command is status request command.

15. The device of claim 11, where the subsequent multipage operation is a multipage program operation.

16. The device of claim 11, where the subsequent multipage operation includes a multipage program operation for programming a stride of memory blocks associated with the non-volatile memory, the stride of memory blocks including at least two memory blocks associated with different address units.

17. A system comprising:
memory storing a plurality of commands; and
a processor coupled to the memory, the processor configurable for:
sending a first command to a non-volatile memory device, the first command operable for configuring non-volatile memory of the non-volatile memory device to prepare for a subsequent operation on the non-volatile memory, the first command including information for analyzing the subsequent operation to optimize the subsequent operation;
sending a second command to the non-volatile memory device to perform the operation on the non-volatile memory; and
receiving data resulting from the operation,
where the information in the first command includes at least one of information associated with the second command, an address count associated with a number of addresses on which the second command is to be performed, or a number of pages that are to be accessed during the second operation.

18. The system of claim 17, where configuring includes changing a command order or using an optimized command set.

19. The system of claim 17, where the command is at least one of a read or program command.

20. The system of claim 17, where the command is status request command.

21. The system of claim 17, where the subsequent operation is a multipage program operation.

22. The system of claim 17, where the subsequent operation is a multipage program operation.

23. A system comprising:
means for sending a first command to a non-volatile memory device, the first command operable for configuring non-volatile memory of the non-volatile memory device to prepare for a subsequent operation on the non-volatile memory, the first command including information for analyzing the subsequent operation to optimize the subsequent operation;
means for sending a second command to the non-volatile memory device to perform the operation on the non-volatile memory; and
means for receiving data resulting from the operation,
where the information in the first command includes at least one of information associated with the second command, an address count associated with a number of addresses on which the second command is to be performed, or a number of pages that are to be accessed during the second operation.

* * * * *